(12) United States Patent
Fujioka et al.

(10) Patent No.: US 9,104,093 B2
(45) Date of Patent: Aug. 11, 2015

(54) ILLUMINATION OPTICAL SYSTEM AND IMAGE PROJECTION DEVICE

(71) Applicants: Tetsuya Fujioka, Kanagawa (JP); Masamichi Yamada, Kanagawa (JP); Yasunari Mikutsu, Tokyo (JP); Hideo Kanai, Tokyo (JP); Satoshi Tsuchiya, Kanagawa (JP); Naoyuki Ishikawa, Kanagawa (JP); Motohisa Ikeda, Tokyo (JP)

(72) Inventors: Tetsuya Fujioka, Kanagawa (JP); Masamichi Yamada, Kanagawa (JP); Yasunari Mikutsu, Tokyo (JP); Hideo Kanai, Tokyo (JP); Satoshi Tsuchiya, Kanagawa (JP); Naoyuki Ishikawa, Kanagawa (JP); Motohisa Ikeda, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 17 days.

(21) Appl. No.: 14/037,578

(22) Filed: Sep. 26, 2013

(65) Prior Publication Data

US 2014/0118706 A1    May 1, 2014

(30) Foreign Application Priority Data

Oct. 25, 2012    (JP) ................. 2012-235824

(51) Int. Cl.
*G03B 21/14*    (2006.01)
*G03B 3/00*    (2006.01)
*G02B 7/02*    (2006.01)
*H04N 9/31*    (2006.01)

(52) U.S. Cl.
CPC .............. *G03B 21/142* (2013.01); *G02B 7/026* (2013.01); *H04N 9/31* (2013.01)

(58) Field of Classification Search
CPC .......... G03B 21/14; G02B 7/02; G02B 7/026
USPC .......... 353/100, 101, 122, 102; 359/811, 818, 359/819, 827
See application file for complete search history.

(56) References Cited

U.S. PATENT DOCUMENTS

| 8,172,408 | B2 * | 5/2012 | Fujiwara et al. ............... 353/101 |
| 2007/0195441 | A1 | 8/2007 | Aizawa et al. |
| 2008/0094582 | A1 | 4/2008 | Nakagawa et al. |
| 2010/0074284 | A1 | 3/2010 | Aizawa et al. |

FOREIGN PATENT DOCUMENTS

| CN | 101533209 | 9/2009 |
| JP | 2000-121900 | 4/2000 |
| JP | 2001-154082 | 6/2001 |

(Continued)

OTHER PUBLICATIONS

Extended European Search Report issued Jan. 29, 2014 in Patent Application No. 13186699.8.

(Continued)

*Primary Examiner* — William C Dowling
*Assistant Examiner* — Ryan Howard
(74) *Attorney, Agent, or Firm* — Oblon, McClelland, Maier & Neustadt, L.L.P.

(57) ABSTRACT

An illumination optical system includes a lens unit that is arranged on a path of an emitted light to an image forming element for forming an image; a holding unit that holds the lens unit; and an elastic body that is attached to the holding unit, and has integrally-formed first and second parts, the first part being biased in a direction of an optical axis of the light to press the lens unit, and the second part being biased in a direction perpendicular to the direction of the optical axis to press the lens unit.

6 Claims, 7 Drawing Sheets

(56) References Cited

FOREIGN PATENT DOCUMENTS

| | | |
|---|---|---|
| JP | 2003-35931 | 2/2003 |
| JP | 2004-117931 | 4/2004 |
| JP | 2005-266702 | 9/2005 |
| JP | 2007-10980 A | 1/2007 |
| JP | 4221787 B2 | 2/2009 |
| JP | 4352284 B2 | 10/2009 |
| JP | 2011-002700 | 1/2011 |
| JP | 2011-059317 | 3/2011 |
| KR | 10-2007-0117864 | 12/2007 |

OTHER PUBLICATIONS

Office Action issued Mar. 24, 2015 in Chinese Patent Application No. 201310501160.X.

* cited by examiner

ILLUMINATION OPTICAL SYSTEM AND IMAGE PROJECTION DEVICE

CROSS-REFERENCE TO RELATED APPLICATIONS

The present application claims priority to and incorporates by reference the entire contents of Japanese Patent Application No. 2012-235824 filed in Japan on Oct. 25, 2012.

BACKGROUND OF THE INVENTION

1. Field of the Invention

The present invention relates to an illumination optical system and an image projection device.

2. Description of the Related Art

Conventionally, there is known an image projection device that causes an image forming unit to generate an image to be projected by using a light emitted from a light source on the basis of image data received from a personal computer (PC) or a video camera, etc. and projects the generated image on a projection surface, such as a screen, to display the image on the projection surface. Such an image projection device is required to be capable of projecting an image on a large screen and reducing the distance between the image projection device and the projection surface as short as possible, and image projection devices enabling a short projection distance have been developed.

In an image projection device, a lens unit for expanding or compressing a light from a light source is arranged on a path of light from the light source to an image forming unit; therefore, the lens unit is required to be accurately fixed to an enclosure. For example, in an image projection device disclosed in Japanese Patent Application Laid-open No. 2005-266702, a lens unit is fixed in such a way that the lens unit is inserted into a holding unit formed on an enclosure, and is pushed against the holding unit by a leaf spring member. Furthermore, in an image projection device disclosed in Japanese Patent Application Laid-open No. 2004-117931, an elastic member for pushing a lens unit in a direction of the optical axis and another elastic member for pushing the lens unit in a vertical direction are disposed.

However, in the image projection devices enabling a short projection distance, a slight misalignment of the lens unit causes a large projection error; therefore, the fixation of the lens unit as described above is required to be performed with higher accuracy.

Therefore, there is a need for an illumination optical system and image projection device that are capable of fixing a lens unit located on a path of light from a light source to an image forming element with higher accuracy.

SUMMARY OF THE INVENTION

According to an embodiment, there is provided an illumination optical system that includes a lens unit that is arranged on a path of an emitted light to an image forming element for forming an image; a holding unit that holds the lens unit; and an elastic body that is attached to the holding unit, and has integrally-formed first and second parts, the first part being biased in a direction of an optical axis of the light to press the lens unit, and the second part being biased in a direction perpendicular to the direction of the optical axis to press the lens unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
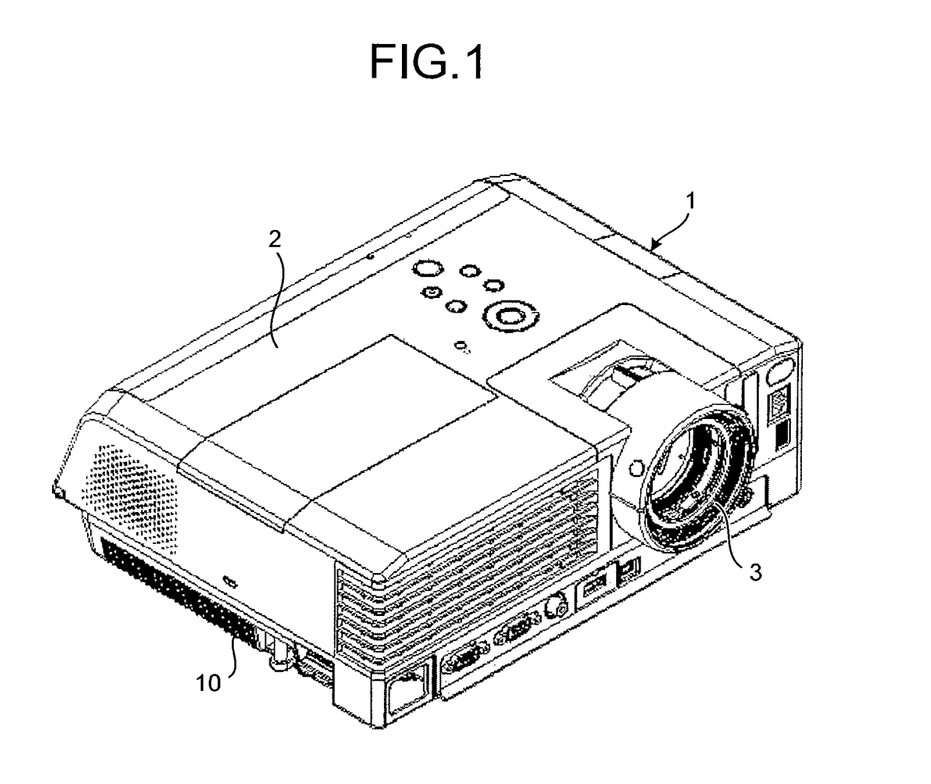
FIG. 1 is a perspective view of a projector according to an embodiment.

An exemplary embodiment of a projector as an example of an image projection device according to the present invention will be explained below with reference to accompanying drawings. The present invention can be applied to other electronic devices that include a speaker and are required to suppress vibration, and can be applied to, for example, a PC and a TV, etc. FIG. 1 is a perspective view of a projector 1, and FIG. 2 is a perspective view of the projector 1 with an upper cover 2 off.

Figure 2:
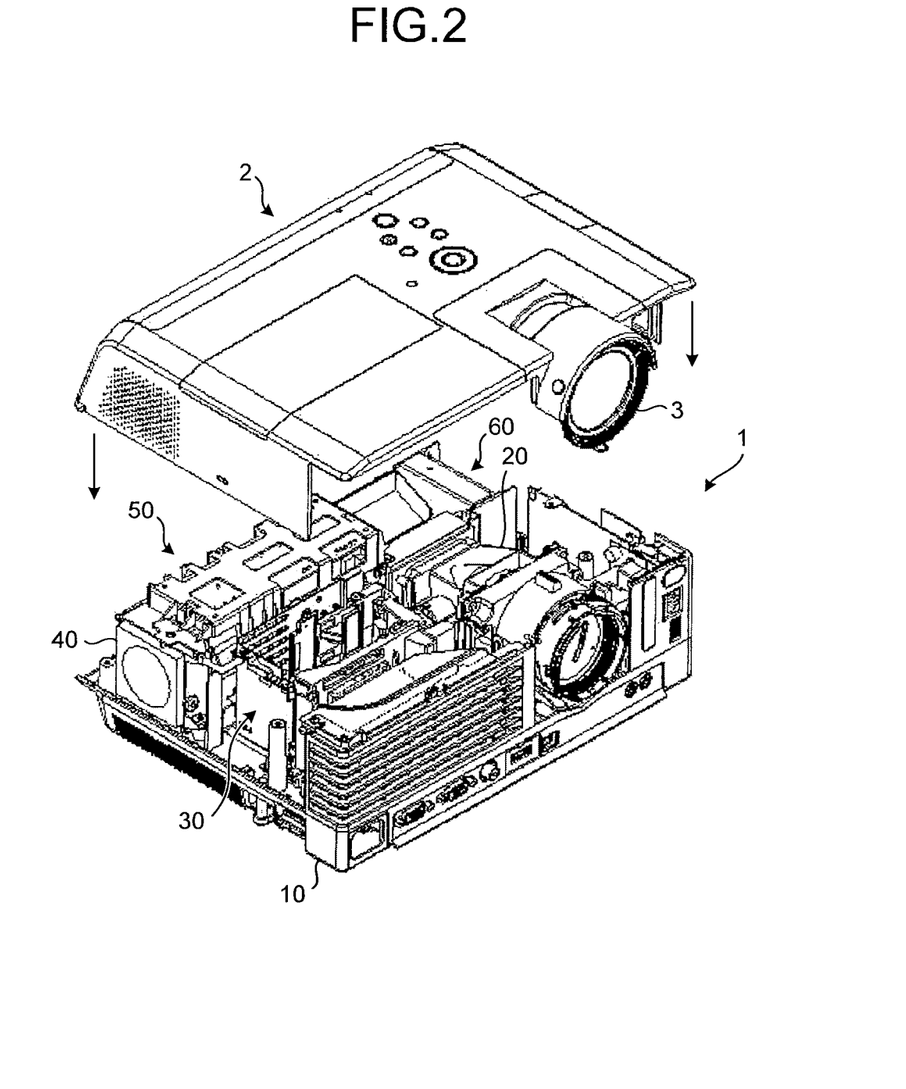
FIG. 2 is a perspective view of the projector with an upper cover off.

As illustrated in FIGS. 1 and 2, a projection lens 3 is attached to the upper cover 2. The projection lens 3 can change the magnification of video or image data to be eventually projected on a projection surface. Furthermore, an optical device 20, a light source device 30, a speaker unit 40, a housing unit 50, and an air intake unit 60 are arranged in a main body 10 composing an enclosure of the projector 1.

Figure 3:
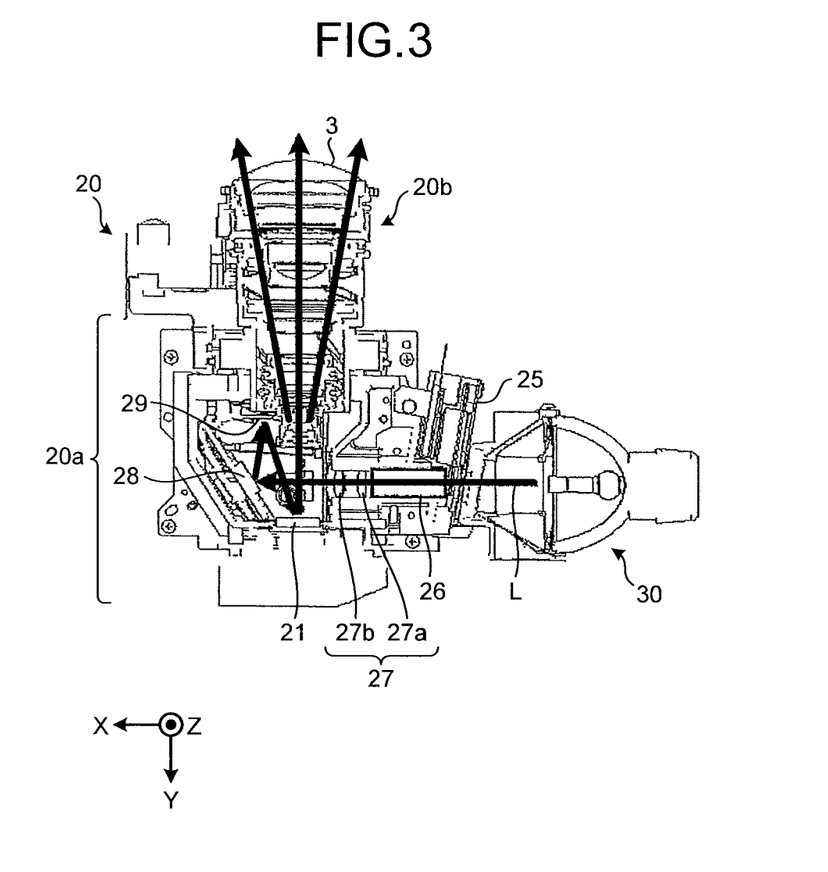
FIG. 3 is a cross-sectional view of an optical device and a light source device according to the embodiment.

FIG. 3 is a cross-sectional view illustrating the detailed configuration of the optical device 20 and the light source device 30. As illustrated in FIG. 3, the optical device 20 includes an illumination optical system 20a and a projection system 20b. The optical device 20 further includes a color wheel 25, a light tunnel 26, relay lenses 27a and 27b, a flat mirror 28, and a concave mirror 29. These members are arranged in a main body of the optical device 20. Furthermore, an image forming unit 21 is arranged in the optical device 20. The image forming unit 21 includes digital micromirror devices (DMDs) serving as is an image forming device for forming an image.

The disc-shaped color wheel 25 converts white light emitted from the light source device 30 into lights of red, green, and blue repeatedly per unit time, and outputs the converted light toward the light tunnel 26. The light tunnel 26 is formed into a cylindrical shape by bonding sheet glasses, and leads the light exiting from the color wheel 25 into a relay lens 27. The relay lens 27 is composed of a combination of the two relay lenses 27a and 27b which is a lens unit composed of a pair of lenses, and condenses the light output from the light tunnel 26 while correcting axial chromatic aberration of the light. The relay lens 27 is located on a path through which the light emitted from the light source device 30 is led to the image forming element that forms an image. The flat mirror 28 and the concave mirror 29 reflect the light output from the relay lens 27 and lead the reflected light into the image forming unit 21 so that the light is focused on the image forming unit 21. The image forming unit 21 includes digital micro-mirror devices (DMDs) having a rectangular mirror surface composed of multiple micromirrors, and processes a projecting light to form predetermined image data and reflects the processed light by driving the micromirrors in a time-division manner on the basis of video or image data.

The light source device 30 includes, for example, a high-pressure mercury lamp as a light source. The light source device 30 emits a white light toward the illumination optical system 20a of the optical device 20. In the illumination optical system 20a, the white light emitted from the light source device 30 is separated into red, green, and blue lights (RGB), and the separated lights are led into the image forming unit 21. Then, the image forming unit 21 forms an image according to a modulation signal, and the projection system 20b enlarges and projects the formed image.

An OFF light plate is provided in an upper portion in the vertical direction of the image forming unit 21, that is, on the near side in FIG. 3. The OFF light plate receives unwanted light not used as a projected light L out of the light entering the image forming unit 21. When light enters the image forming unit 21, a plurality of micromirrors are activated by operations of the DMD in a time-division manner based on moving image data. The micromirrors reflect the light in use to the projector lens 3 and reflect the light to be discarded to the OFF light plate. In the image forming unit 21, the light used for a projected image is reflected to the projecting mechanism 20b, magnified through the projector lenses 3, whereby the magnified image light is projected.

Figure 4:
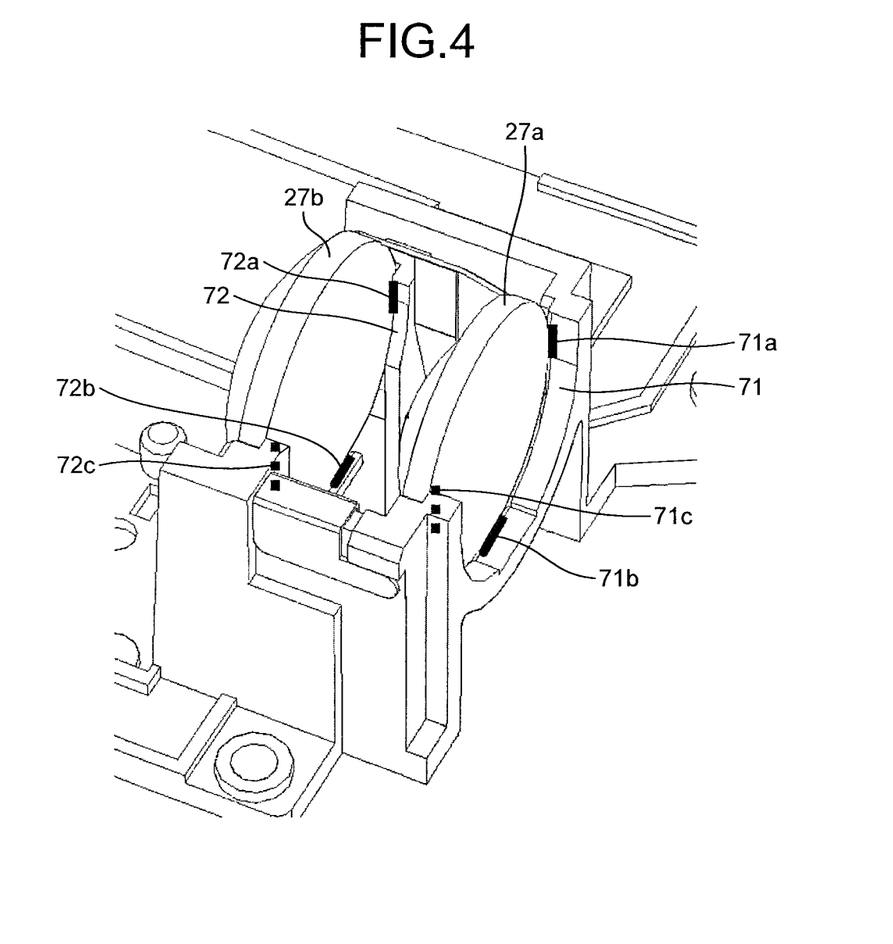
FIG. 4 is an explanatory diagram illustrating the arrangement and fixation of a pair of relay lenses according to the embodiment viewed from the entrance side of a light.
Figure 5:
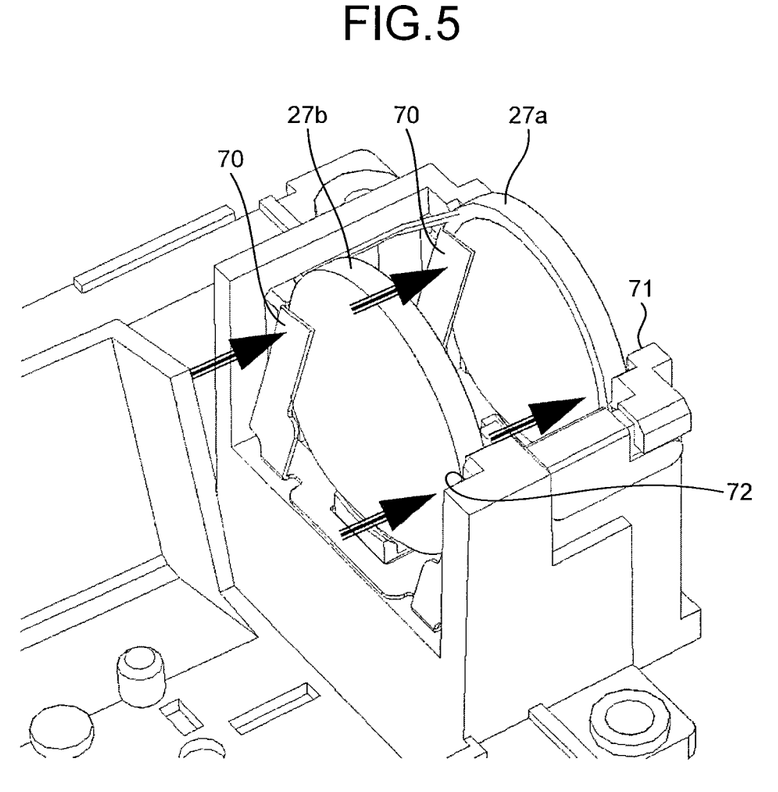
FIG. 5 is an explanatory diagram illustrating the arrangement and fixation of the pair of relay lenses viewed from the exit side of the light.
Figure 6:
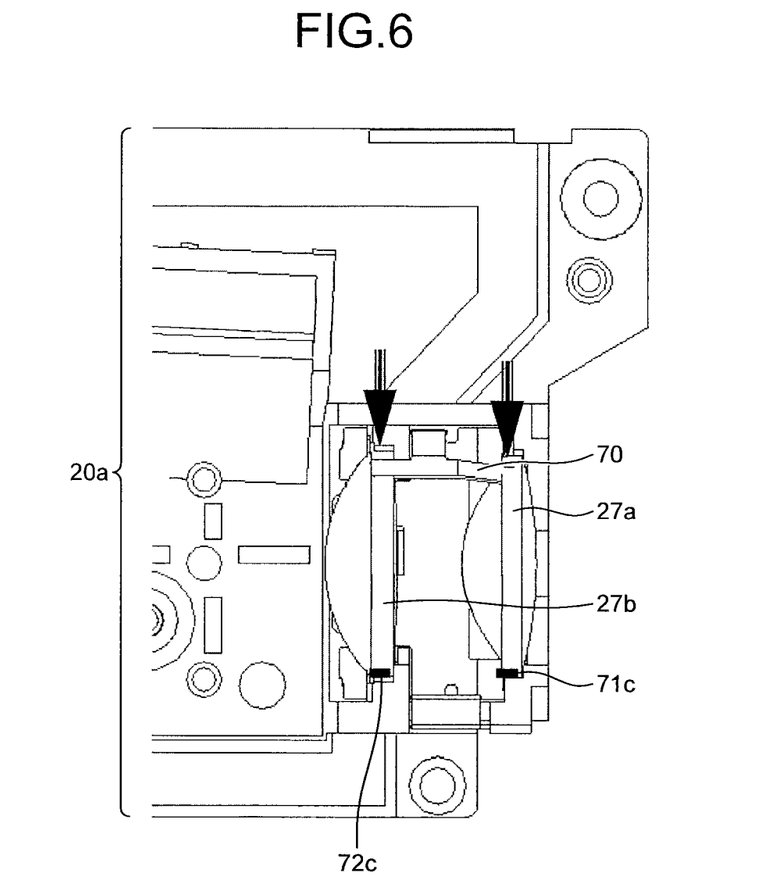
FIG. 6 is an explanatory diagram illustrating the arrangement and fixation of the pair of relay lenses viewed from a direction perpendicular to the optical axis of the light.
Figure 7:
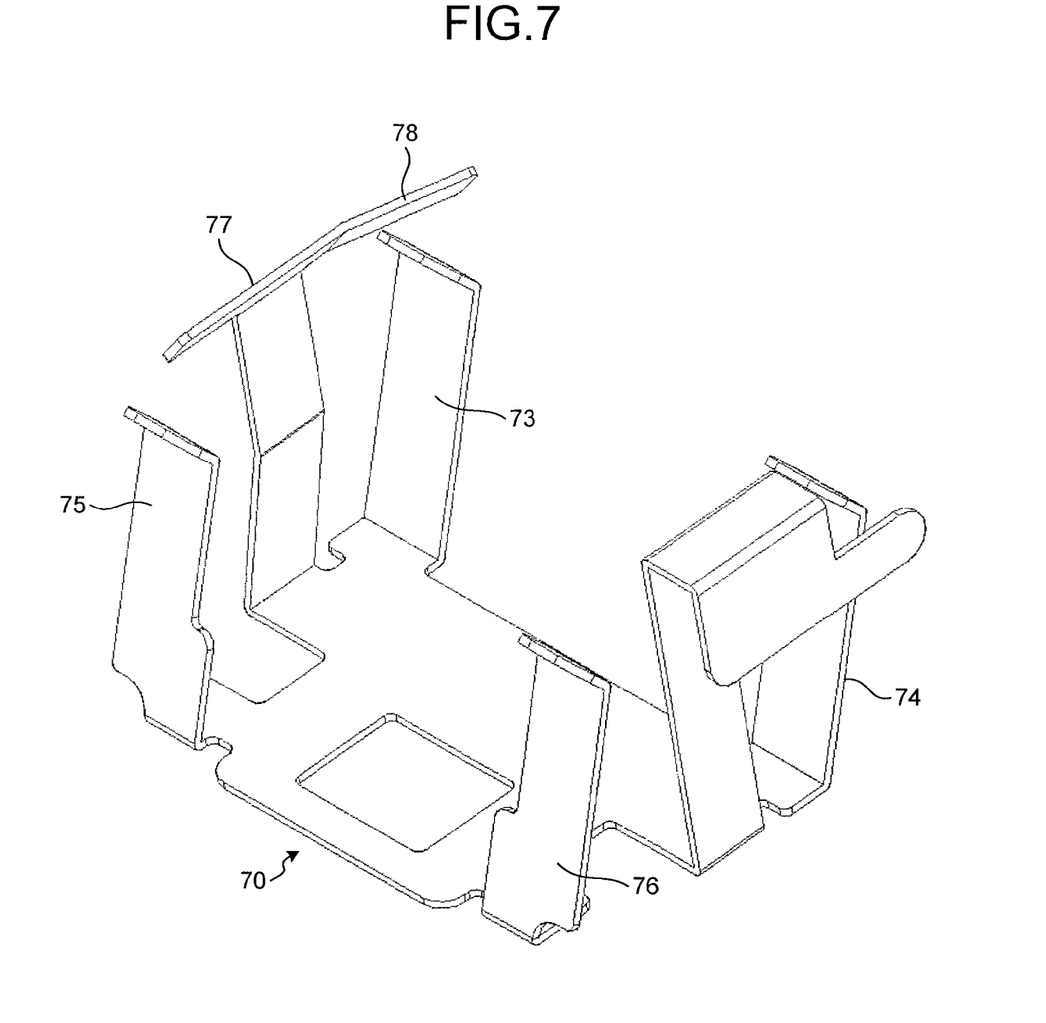
FIG. 7 is a perspective view of an elastic member according to the embodiment.

Subsequently, the structure of installation of the relay lens 27 in the main body 10 is explained with reference to FIGS. 4 to 7. FIG. 4 is an explanatory diagram illustrating the arrangement and fixation of the relay lenses 27a and 27b viewed from the entrance side of a light. FIG. 5 is an explanatory diagram illustrating the arrangement and fixation of the relay lenses 27a and 27b viewed from the exit side of the light. FIG. 6 is an explanatory diagram illustrating the arrangement and fixation of the relay lenses 27a and 27b viewed from a direction perpendicular to the optical axis of the light. FIG. 7 illustrates the shape of an elastic member 70 for fixing the relay lens 27.

As illustrated in FIGS. 4 to 6, the relay lenses 27a and 27b are arranged approximately parallel to a holding unit forming a housing of the relay lenses 27a and 27b so as to be coaxial with the optical axis of a light emitted from the light source device 30. The holding unit is composed of a holding unit 71 having a shape along the relay lens 27a and a holding unit 72 having a shape along the relay lens 27b. The holding unit 71 actually has a three-point contact with the relay lens 27a. The three contact points are contact portions 71a to 71c. The contact portion 71a comes into contact with an upper right portion of the relay lens 27a viewed from the side of the light source device 30. The contact portion 71b comes into contact with a lower end portion of the relay lens 27a viewed from the side of the light source device 30. The contact portion 71c comes into contact with an upper left portion of the relay lens 27a viewed from the side of the light source device 30. The contact portions 71a and 71c are linearly symmetric about a line passing through the optical axis. Therefore, the holding unit 71 is molded so that a portion of the holding unit 71 other than the contact portions 71a to 71c is cut out. Therefore, the cutout portion corresponds to a non-contact portion. Furthermore, the holding unit 72 also has contact portions 72a to 72c formed in the same way.

The relay lenses 27a and 27b each have a convex curved surface and a flat surface; the curved surface is located on the exit side of a light, and the flat surface is located on the entrance side of the light. Therefore, in the present embodiment, the light-entrance-side surface of the relay lens 27a comes into contact with the contact portions 71a to 71c, and the light-entrance-side surface of the relay lens 27b comes into contact with the contact portions 72a to 72c. The elastic member 70 is inserted into a space formed by the holding units 71 and 72. The elastic member 70 is configured to fit with the shape of the holding units 71 and 72, and is fixed to the holding units 71 and 72 by the insertion. The elastic member 70 is formed of, for example, a leaf spring or an elastically-deformable resin member.

As illustrated in FIG. 7, the elastic member 70 includes presser parts 73 to 78. The presser part 73 (a first part) presses the relay lens 27a from the light exit side against the contact portion 71a, i.e., in a direction of the optical axis. The presser part 74 (the first part) presses the relay lens 27a from the light exit side against the contact portion 71c, i.e., in the direction of the optical axis. The presser part 75 (the first part) presses the relay lens 27b from the light exit side against the contact portion 72a, i.e., in the direction of the optical axis. The presser part 76 (the first part) presses the relay lens 27b from the light exit side against the contact portion 72c, i.e., in the direction of the optical axis. The presser part 77 (a second part) presses the relay lens 27b obliquely downward from the top right of the relay lens 27b viewed from the light source device 30 against the contact portion 72b, i.e., in a direction perpendicular to the direction of the optical axis. The presser part 78 (the second part) presses the relay lens 27a obliquely downward viewed from the light source device 30 against the contact portion 71b, i.e., in the direction perpendicular to the direction of the optical axis. The presser parts 77 and 78 are integrally formed in such a manner that the presser parts 77 and 78 branch from a single member.

In the above-described configuration, when arranging the relay lenses 27a and 27b in the main body 10, the elastic member 70 is first disposed. Then, the relay lens 27a is to be arranged in the holding unit 71; however, the presser parts 78, 73, and 74 of the elastic member 70 are biased to the side of the relay lens 27a, so the relay lens 27a is arranged in the holding unit 71 by pushing the presser parts 73, 74, and 78 aside by the relay lens 27a so as not to obstruct the arrangement. On completion of the arrangement, the presser parts 73, 74, and 78 pushed aside by the relay lens 27a try to return back to their original positions, and therefore the relay lens 27a is pressed against the contact portions 71a to 71c.

Then, the relay lens 27b is to be arranged in the holding unit 72; however, the presser parts 77, 75, and 76 of the elastic member 70 are biased to the side of the relay lens 27b, so the relay lens 27b is arranged in the holding unit 72 by pushing the presser parts 75, 76, and 77 aside by the relay lens 27b so as not to obstruct the arrangement. On completion of the arrangement, the presser parts 75, 76, and 77 pushed aside by the relay lens 27b try to return back to their original positions, and therefore the relay lens 27b is pressed against the contact portions 72a to 72c.

In the illumination optical system described above, a pair of the relay lenses 27a and 27b is pressed against the holding units 71 and 72 constituting the enclosure by the shared elastic member 70. Therefore, the relay lenses can be accurately fixed and positioned by a small number of parts. Furthermore, as the elastic member 70 is formed of one member, the elastic member 70 is stably fixed to the holding units 71 and 72 as compared with a case where an elastic member is separately formed, and can suppress a shift in fixation of the relay lenses 27a and 27b; therefore, it is possible to further increase the accuracy of fixation.

Moreover, the presser part 78 for pressing the relay lens 27a from the top of the relay lens 27a and the presser part 77 for pressing the relay lens 27b from the top of the relay lens 27b are formed as one part, and therefore the elastic member 70 can be more easily and accurately formed.

Furthermore, instead of holding the relay lenses 27a and 27b with the overall holding units 71 and 72, a portion of each of the holding units 71 and 72 is cut out, thereby bringing only the contact portions 71a to 71c and 72a to 72c of the holding units 71 and 72 into contact with the relay lenses 27a and 27b; therefore, it is possible to further increase the accuracy of fixation.

The holding units 71 and 72 are configured to have contact with the light-entrance-side surfaces of the relay lenses 27a and 27b, respectively. Alternatively, the holding units 71 and 72 can be configured to have contact with the light-exit-side surfaces of the relay lenses 27a and 27b, respectively. In this case, the pressing direction of the elastic member 70 changes to an opposite direction, so it is necessary to change the shape of the elastic member 70 according to the positions of the holding units. Furthermore, the light-exit-side surfaces of the relay lenses 27a and 27b have the curved shape, and therefore, even if there is a slight misalignment of the relay lenses 27a and 27b, the influence of the misalignment can be suppressed on the light exit side than that on the light entrance side.

Moreover, the presser parts 78 and 77 of the elastic member 70 are configured to press the relay lenses 27a and 27b obliquely downward, thereby applying both a downward vector and a transverse vector to the relay lenses 27a and 27b; however, the presser parts 78 and 77 only have to be configured to apply at least a downward vector to the relay lenses 27a and 27b. Furthermore, the presser parts 77 and 78 do not have to be formed of a single member.

Moreover, there is described the configuration using the DMDs as an image forming element; however, other image forming elements, such as a liquid crystal element, can be used. Furthermore, both of the relay lenses 27a and 27b do not always have to be installed; alternatively, the relay lens 27 can be composed of one relay lens.

According to the present invention, it is possible to fix a lens unit located on a path of light from a light source to an image forming element with higher accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An illumination optical system comprising:
   a lens unit that is arranged on a path of an emitted light to an image forming element for forming an image;
   a holding unit that holds the lens unit; and
   an elastic body that is attached to the holding unit, and has integrally-formed first and second parts, the first part being biased in a direction of an optical axis of the light to press the lens unit, and the second part being biased in a direction perpendicular to the direction of the optical axis to press the lens unit,
   wherein:
   the lens unit includes a pair of lenses, and
   out of portions of the elastic body that presses the pair of lenses, portions that correspond to the pair of lenses and are biased in the direction perpendicular to the direction of the optical axis are formed on a same member.

2. The illumination optical system according to claim 1, wherein
   the elastic body presses the lens unit from a light exit side of the lens unit against the holding unit in the direction of the optical axis of the light.

3. The illumination optical system according to claim 1, wherein
   the elastic body is biased in a obliquely downward direction toward the holding unit, to press the lens unit in the direction perpendicular to the direction of the optical axis.

4. The illumination optical system according to claim 1, wherein
   the holding unit includes a cutout non-contact portion not coming into contact with the lens unit and a contact portion coming into point contact with the lens unit.

5. An image projection device comprising:
   the illumination optical system according to claim 1;
   a light source device that emits a light;
   the image forming element that receives the light emitted from the light source device through the illumination optical system, and generates an image to be projected; and
   a projection lens that projects the generated image.

6. An illumination optical system comprising:
   a pair of lenses on a path of an emitted light to an image forming element for forming an image;
   a holder that holds the pair of lenses; and
   an elastic body that is attached to the holder, and has integrally-formed first and second parts, the first part being biased in a direction of an optical axis of the light to press the pair of lenses, and the second part being biased in a direction perpendicular to the direction of the optical axis to press the pair of lenses,
   wherein portions of the elastic body that press the pair of lenses and are biased in the direction perpendicular to the direction of the optical axis are formed on a same member.

* * * * *